US009860109B2

(12) United States Patent
Koverman et al.

(10) Patent No.: US 9,860,109 B2
(45) Date of Patent: Jan. 2, 2018

(54) AUTOMATIC ALERT GENERATION (71) Applicant: GetGo, Inc., Boston, MA (US)

(72) Inventors: Christopher K. Koverman, San Jose, CA (US); Nikolay Avrionov, Santa Barbara, CA (US); Ashish V. Thapliyal, Santa Barbara, CA (US)

(73) Assignee: GetGo, Inc., Boston, MA (US)

( * ) Notice: Subject to any disclaimer, the term of this patent is extended or adjusted under 35 U.S.C. 154(b) by 717 days.

(21) Appl. No.: 14/271,678

(22) Filed: May 7, 2014

(65) Prior Publication Data

US 2015/0326446 A1  Nov. 12, 2015

(51) Int. Cl.
*H04L 12/24* (2006.01)
*H04L 12/26* (2006.01)

(52) U.S. Cl.
CPC ...... *H04L 41/0631* (2013.01); *H04L 41/0627* (2013.01); *H04L 41/142* (2013.01);
(Continued)

(58) Field of Classification Search
CPC ............ H04L 1/00; H04L 1/0078; H04L 1/24–1/242; H04L 29/00; H04L 29/02; H04L 41/00; H04L 41/02; H04L 41/0213; H04L 41/0246; H04L 41/06; H04L 41/0604; H04L 41/0613; H04L 41/0627; H04L 41/0631; H04L 41/0636; H04L 41/065–41/0654; H04L 41/0686;
(Continued)

(56) References Cited

U.S. PATENT DOCUMENTS 5,495,607 A * 2/1996 Pisello .............. G06F 17/30126
  707/781
5,619,656 A * 4/1997 Graf .................... G06F 11/0715
  700/12
(Continued)

FOREIGN PATENT DOCUMENTS

JP  2000148690 A  5/2003
WO  2007063445 A2  6/2007

OTHER PUBLICATIONS

Jonathon Abbott, et al.; "Automated Recognition of Event Scenarios for Digital Forensics"; Proceedings of the 2006 ACM Symposium on Applied Computing; Sac '06; Apr. 23, 2006 (Apr. 23, 2006); pp. 293-300; XP055057891; New York, New York, USA; DOI: 10.1145/1141277.1141346; ISBN: 978-1-59-593108-5—the whole document.

*Primary Examiner* — Tauqir Hussain
*Assistant Examiner* — Boris Grijalva Lobos
(74) *Attorney, Agent, or Firm* — BainwoodHuang (57) ABSTRACT

Improved techniques of identifying when a device needs of service involve using data analytics to determine conditions when a device administrator of a computerized device is to be sent an alert regarding that device. Along these lines, a device monitoring system receives state data from a device that indicates the device is in a particular state, e.g., running certain applications, using some percentage of the processor and memory capacity, etc. The device monitoring system maps the device state data to a decision of whether or not to send a device administrator an alert concerning the device. The decision itself is a result of applying a model to the state data that is derived from the application of data analytics on historical device state data and administrator login data.

23 Claims, 7 Drawing Sheets

(52) U.S. Cl.
CPC .......... *H04L 43/08* (2013.01); *H04L 43/0817* (2013.01); *H04L 41/048* (2013.01); *H04L 41/069* (2013.01); *H04L 41/16* (2013.01); *H04L 41/28* (2013.01)

(58) Field of Classification Search
CPC ...... H04L 41/069; H04L 41/14–41/147; H04L 43/00; H04L 43/02; H04L 43/028; H04L 43/06; H04L 43/065; H04L 43/08; H04L 43/0817; H04L 43/0823; H04L 41/048; G06F 11/07; G06F 11/0781; G06F 11/0793; G06F 11/1629; G06F 11/36
See application file for complete search history.

(56) References Cited

U.S. PATENT DOCUMENTS

| | | | | |
|---|---|---|---|---|
| 6,170,056 B1 * | 1/2001 | Sidie | ................. | G06F 8/60 710/220 |
| 6,212,256 B1 * | 4/2001 | Miesbauer | ............... | H05G 1/26 378/118 |
| 6,865,719 B1 * | 3/2005 | Nicholas, III | ......... | G06Q 30/02 715/854 |
| 7,158,022 B2 * | 1/2007 | Fallon | .............. | G08B 13/19656 340/505 |
| 7,290,282 B1 * | 10/2007 | Renert | .................. | G06F 21/562 726/22 |
| 7,574,382 B1 * | 8/2009 | Hubert | ............... | G06Q 30/0623 705/26.61 |
| 8,495,424 B1 * | 7/2013 | Vannatter | ............... | G06Q 10/00 714/25 |
| 9,081,656 B2 * | 7/2015 | Yingling, Jr. | ......... | G06F 11/008 |
| 9,183,518 B2 * | 11/2015 | Yingling, Jr. | .......... | G06Q 10/04 |
| 9,314,154 B2 * | 4/2016 | Palanker | ............. | A61B 3/0025 |
| 9,396,444 B2 * | 7/2016 | Bates | .................... | G06Q 30/02 |
| 2002/0144156 A1 * | 10/2002 | Copeland, III | ....... | H04L 43/026 726/22 |
| 2002/0174362 A1 * | 11/2002 | Ullmann | ............. | H04L 12/2602 726/13 |
| 2004/0229730 A1 * | 11/2004 | Ainsworth | ............. | A63B 24/00 482/8 |
| 2005/0120113 A1 * | 6/2005 | Bunch | .................... | H04L 43/06 709/224 |
| 2006/0131380 A1 * | 6/2006 | Forrest | ............... | G07D 11/0048 235/376 |
| 2008/0140817 A1 * | 6/2008 | Agarwal | ............. | H04L 41/0677 709/223 |
| 2009/0204955 A1 * | 8/2009 | Su | ........................... | G06F 21/57 717/168 |
| 2009/0245109 A1 * | 10/2009 | Hurley | .................. | H04L 43/026 370/235 |
| 2009/0309721 A1 * | 12/2009 | Kitahara | ............ | G05B 23/0272 340/540 |
| 2012/0072844 A1 * | 3/2012 | Lefrancois des Courtis | .................. | G06Q 30/02 715/736 |
| 2015/0188925 A1 * | 7/2015 | Gupta | ................... | H04L 63/101 726/4 |

* cited by examiner

AUTOMATIC ALERT GENERATION

BACKGROUND

Cloud-based, information technology (IT) monitoring systems enable an IT professional to acquire information about customer systems from a remote location. Such IT monitoring systems include a central server that acquires system information from the customer systems and presents that information to the IT professional over a network.

The central server in a conventional cloud-based, IT monitoring system may send a notification to the IT professional when a customer system needs attention. Such notifications may take the form of emails, SMS messages, phone calls, and the like.

SUMMARY

The number of situations for which a conventional cloud-based, IT monitoring system may send an IT professional such as a device administrator a notification that a device under his or her watch needs servicing is potentially enormous. For example, the monitoring system may send the device administrator an alert in response to a disk error indicated in a system log, failure of a service liveness test (e.g., an internal web server is down), or internet security software being disabled on a device. In the face of receiving so many alerts, the device administrator may ignore a large fraction of those alerts he or she receives.

One way that this problem may be addressed is to introduce a set of rules under which the monitoring system is to send the device administrator an alert regarding a device under his or her watch. In a typical operation, the device administrator manually fills out a rules template that describes such conditions. A device administrator working remotely may simply rely on his or her past experience in determining these conditions and therefore the rules.

Unfortunately, there are deficiencies with the above-described conventional IT-based monitoring systems. For example, such a manual selection of conditions for receiving notifications tends to be burdensome and error-prone for the device administrator. Further, the selection such conditions is based largely on that particular device administrator's experience and ignores the greater wealth of experience of other administrators. Accordingly, the device administrator may be missing out on potentially important alerts and receiving alerts that are less important.

In contrast to the conventional IT-based monitoring system which may cause a device administrator to miss out on potentially important alerts, improved techniques involve using data analytics to determine conditions when a device administrator of a computerized device is to be sent an alert regarding that device. Along these lines, a device monitoring system receives state data from a device that indicates the device is in a particular state, e.g., running certain applications, using some percentage of the processor and memory capacity, etc. The device monitoring system maps the device state data to a decision of whether or not to send a device administrator an alert concerning the device. The decision itself is a result of applying a model to the state data that is derived from the application of data analytics on historical device state data and administrator login data.

Advantageously, the improved techniques allow for a device monitoring system to automatically provide alerts in situations where other administrators were known to have accessed their respective devices. Because the decision whether to provide an alert is based on data that may be updated at any time, such a decision may reflect new experiences from other administrators that would otherwise not be reflected in a static rules table.

One embodiment of the improved technique is directed to a method of identifying when a device is in need of service. The method includes receiving device state data over the network interface from the device, the device state data indicating that the device is in a particular state. The method also includes inputting the device state data into a model that maps the device state data to a likelihood that a typical system administrator accesses a modeled device when the modeled device is in the particular state, the model having been generated from a correlation operation between (i) device state data received from a set of devices, and (ii) administrator login data providing instances in time when system administrators accessed the set of devices. The method further includes, in response to a sufficiently high likelihood that the typical system administrator accesses the modeled device when the modeled device is in the particular state, sending, over the network interface, a notification that the device is in need of service to a system administrator responsible for providing service to the device.

Additionally, some embodiments of the improved technique are directed to a system constructed and arranged to identify when a device is in need of service. The system includes a network interface, memory, and a controller including controlling circuitry constructed and arranged to carry out the method of identifying when a device is in need of service.

Furthermore, some embodiments of the improved technique are directed to a computer program product having a non-transitory computer readable storage medium which stores code including a set of instructions which, when executed by a computer, cause the computer to carry out the method of identifying when a device is in need of service.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques of identifying when a device is in need of service involve using data analytics to determine conditions when a device administrator of a computerized device is to be sent an alert regarding that device. Along these lines, a device monitoring system receives state data from a device that indicates the device is in a particular state, e.g., running certain applications, using some percentage of the processor and memory capacity, etc. The device monitoring system maps the device state data to a decision of whether or not to send a device administrator an alert concerning the device. The decision itself is a result of applying a model to the state data that is derived from the application of data analytics on historical device state data and administrator login data.

Figure 1:
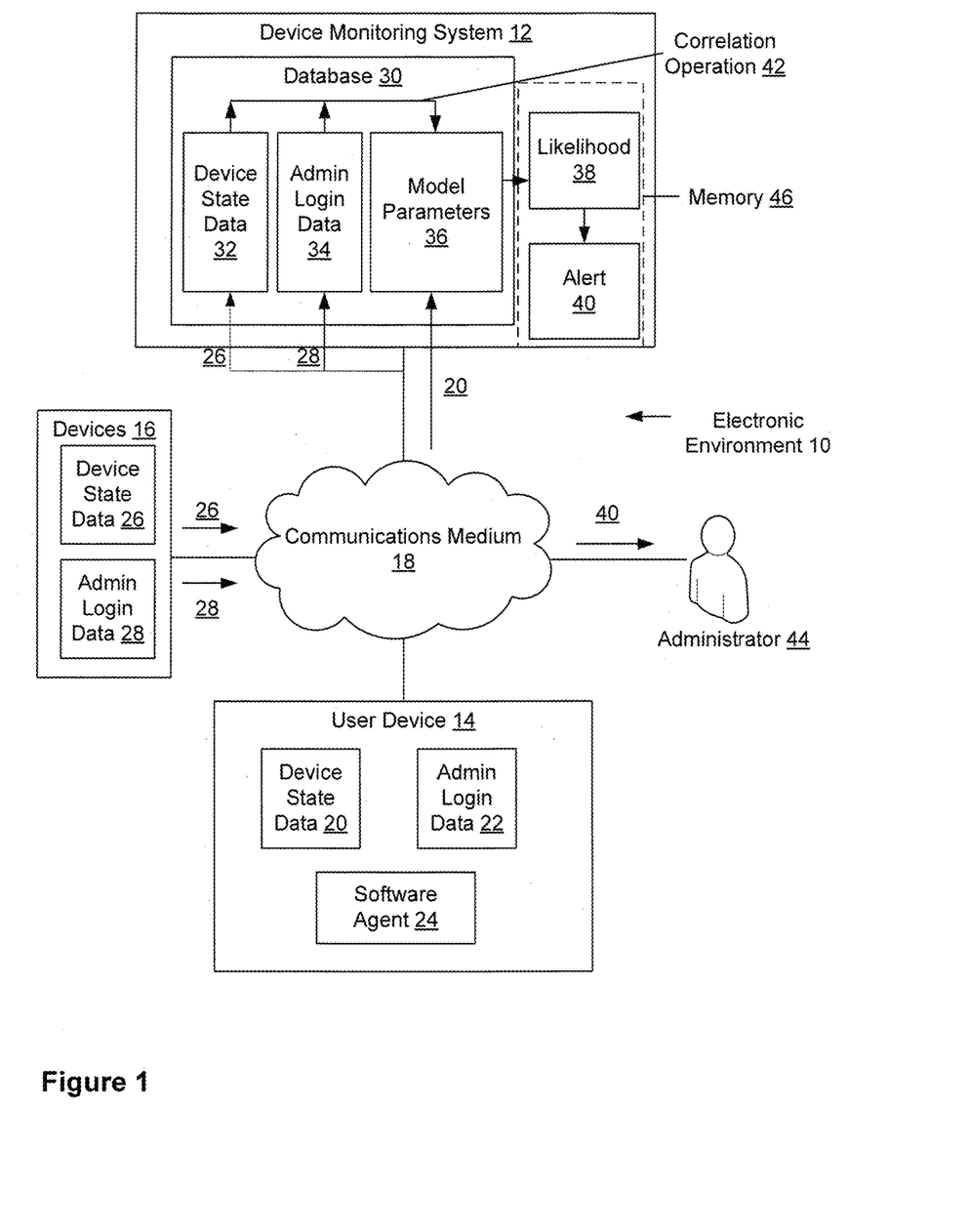
FIG. 1 is a block diagram illustrating an example electronic environment in which the improved technique is carried out.

FIG. 1 illustrates an example electronic environment 10 in which the improved techniques hereof are carried out. Electronic environment 10 includes a device monitoring system 12, a user device 14, a set of other devices 16, and a communications medium 18.

User device 14 may be any computing device (e.g., desktop PC, laptop, smartphone, tablet, and the like) configured for use by an end user and maintained by an administrator 44 that monitors user device 14 and other devices from a remote location. User device 14 is also configured to send state data 20 to device monitoring system 12 as part of a continuous monitoring operation. User device 14 is further configured to record times at which administrator 44 logs in to user device 14 to, e.g., perform a repair in response to an alert or a ticket, as administrator login data 22.

Device monitoring system 12 is configured to decide whether to send an alert to an administrator 44 of user device 14 based on the current state of user device 14. In order to make such a decision, device monitoring system 12 is also configured to receive device state data 20 from user device 14 that indicates the state of user device 14. Upon receipt, device monitoring system is further configured to apply a model to device state data 20 to derive the likelihood 38 that a typical administrator would access a modeled device having a similar state as user device 14. When likelihood 38 is sufficiently high, device monitoring system 12 is further configured to send an alert 40 to administrator 44. Device monitoring system 12 may be a server, although in some arrangement device monitoring system may be a server cluster or any other computing system that has sufficient processor capacity to carry out decision making. Device monitoring system contains a database 30 and memory 46.

It should be understood that the output likelihood 38 is a numerical quantity representing a chance that, given that a typical device is in the state indicated by device state data 20, a typical administrator would respond to an alert 40 and access that typical device. Thus, in some arrangements, likelihood 38 may be represented by a conditional probability. When such a probability is greater than a certain threshold (e.g., 50%, 80%, 90%, or higher but less than 100%), then device monitoring system is configured to send alert 40 to administrator 44.

Alert 40 typically takes the form of a message to administrator 44 that user device 14 needs attention for a specific reason. Such a message may take the form of an email, a SMS message, a phone call, or the like. A goal of the device monitoring system 12 is to reserve alerts such as alert 40 for only those device states that a typical administrator would deem worthy of an administrator login.

It should be understood that, in some arrangements, alerts such as alert 40 may be tailored for particular administrators. For example, device monitoring system 12 may also be configured to associate administrator identifiers with specific administrator actions in response to specific device states. Similarly, alerts can be tailored to administrators using recommendation systems or collaborative filtering techniques. Further, an administrator similarity metric may be defined and based on a historical behavior of administrator responses to identical alerts.

Database 30 is configured to store model parameter values 36 used to generate the likelihood 38 as described above based on input device state data 20. For example, model parameter values 36 may represent weights assigned to each parameter of device state data 20. Database 30 may take the form of a structure or unstructured database.

Device state data 20 consists of data describing the health or operation of any component of user device 14. Examples of device state data 20 may include applications installed, applications currently running, operating system installed, version of operating system running, memory utilization, processor utilization, storage access rates, network utilization, and the like.

In some arrangements, user device 14 runs a software agent 24 that is configured to collect device state data 20 and send it to device monitoring system 12. Software agent 24 is configured to collect and send state data 20 at periodic intervals (e.g., every 15 minutes, hourly, daily, etc.) or in response to an event (e.g., an application crashed, there was a failed login attempt, etc.).

Administrator login data 22 contains a time-based record of when administrator 44 logs into user device 14 in order to access its components and/or data for a repair or an inspection. In some arrangements, administrator login data 22 also contains a listing of applications accessed, hardware components configured, or commands executed. In some further arrangements, admin login data 22 contains each event (e.g., mouse click, keyboard stroke, and the like) induced by administrator 44.

Communications medium 18 provides network connections between device monitoring system 12, user device 14, and any other devices 16. Communications medium 18 may implement a variety of protocols such as TCP/IP, UDP, ATM, Ethernet, Fibre Channel, combinations thereof, and the like. Furthermore, communications media 44 may include various components (e.g., cables, switches/routers, gateways/bridges, NAS/SAN appliances/nodes, interfaces, etc.). Moreover, communications medium 18 is capable of having a variety of topologies (e.g., queue manager-and-spoke, ring, backbone, multi drop, point to-point, irregular, combinations thereof, and so on).

In some arrangements, device monitoring system 12 is further configured to generate model parameter values 36. In such arrangements, database 30 is also configured to store data, such as historical device state data 32 and administrator login data 34, used to derive model parameter values 36. In generating the model, device monitoring system 12 is configured to obtain device state data 26 and administrator login data 28 from a set of other devices 16. Device monitoring system 12 is also configured to store this data among historical device state data 32 and administrator login data 34 within database 30. Device monitoring system 12 is further configured to perform a correlation operation 42 on historical device state data 32 and administrator login data 34 to generate model parameter values 36.

Correlation operation 42 involves a process of finding a cause and effect relationship between device state data 32 and administrator login data 34. In some arrangements, correlation operation 42 involves forming pairs of device states and decisions of an administrator to log in or not. A result of correlation operation 42 involves assigning to each pair a number indicative of how well correlated the paired items are. In further arrangements, the number may be a correlation coefficient that takes on values between zero and one, with zero indicating a completely uncorrelated pair and one indicating a perfectly correlated pair. From these correlation coefficients, device monitoring system 12 can determine which components of device state data 20 will most likely affect whether an administrator will access a device.

It should be understood that the number of possible device states is enormous; thus, it is likely that only a fraction of possible device states will be stored in database 30. It is further likely that the state indicated by device state data 20 is not a state used in the generation of model parameter values 36.

It should be understood that, in some arrangements, the model may take the form of a rules table; model parameter values 36 might in that case represent parameter values used to quantify particular rules.

The set of other devices 16 are electronic devices that may or may not have similar traits as user device 14. Each of the set of other devices 16 may be monitored by another administrator, or by administrator 44. Each of the set of other devices 16 is configured to send device state data 26 and administrator login data 28 to device monitoring system 12 on a continuous or periodic basis, although in some arrangements, some or all of devices 16 may send such data 26 and 28 in response to an event. In some further arrangements, a software agent may send data 26 and 28 to device monitoring system 12.

It should be understood that device monitoring system 12 sends out alerts regarding user device 14. Device monitoring system 12, on the other hand, is not sending out alerts for devices 16 for the purposes of this example (although it could do so). Rather, device monitoring system 12 builds the model from the device states data 26 and administrator login data 28 from devices 16 from which device monitoring system 12 will decide whether to send an alert to system administrator 44.

During operation, user device 14 sends device state data 20 to device monitoring system 12 via communications medium 18. For example, as discussed above, software agent 24 collects device state data 20 in user device 14 and sends state data 20 to device monitoring system 12. Software agent 24 collects and sends state data 20 either periodically or in response to an event such as a software crash. In other arrangements, software agent 24 sends state data 20 in response to an administrator login.

Upon receipt of device state data 20, device monitoring system 12 inputs device state data 20 into a model having model parameter values 36 stored in database 30. The result of applying this model to device state data 20 is the generation of the likelihood 38 that a typical administrator would access a modeled device having the state indicated by device state data 20.

When the likelihood 38 is greater than a threshold likelihood, say, a 50% chance that the typical administrator would access a modeled device, device monitoring system 12 produces an alert 40 and sends alert 40 to administrator 44 over communications medium 18 as, e.g., an email.

In some arrangements, device monitoring system 12 generates model parameter values 36 from historical state data 32 and administrator login data 34. In an example model generation, device monitoring system 12 forms pairs of device states and administrator logins from historical state data 32 and administrator login data 34, respectively. Device monitoring system 12 then performs correlation operation 42 on the pairs to produce a correlation coefficient. From the coefficients, device monitoring system 12 then determines which components of state data 32 have the most or least effect on whether a typical administrator will access a device. Device monitoring system 12 accordingly assigns weights to the state data components indicative of the degree to which the components affect administrator logins.

Prior to an example model generation, device monitoring system 12 obtains device state data 26 and administrator login data 28 from the set of devices 16, either on a periodic basis or in response to events on devices 16. In some arrangements, each device 16 employs its own software agent to collect and send data 26 and 28. Upon receipt of data 26 and 28, device monitoring system 12 updates historical state data 32 and administrator login data 34 with state data 26 and login data 28, respectively.

In other arrangements, a device of the set of devices 16 may send data 26 and 28 in response to a change in administrator login data 28. In this case, device monitoring system 12 forms transition states from device state data 26 consisting of the change in state data as a result of the change in administrator login data 28. Device monitoring system 12 then generates model parameter values 36 using the formed transition states.

Figure 2:
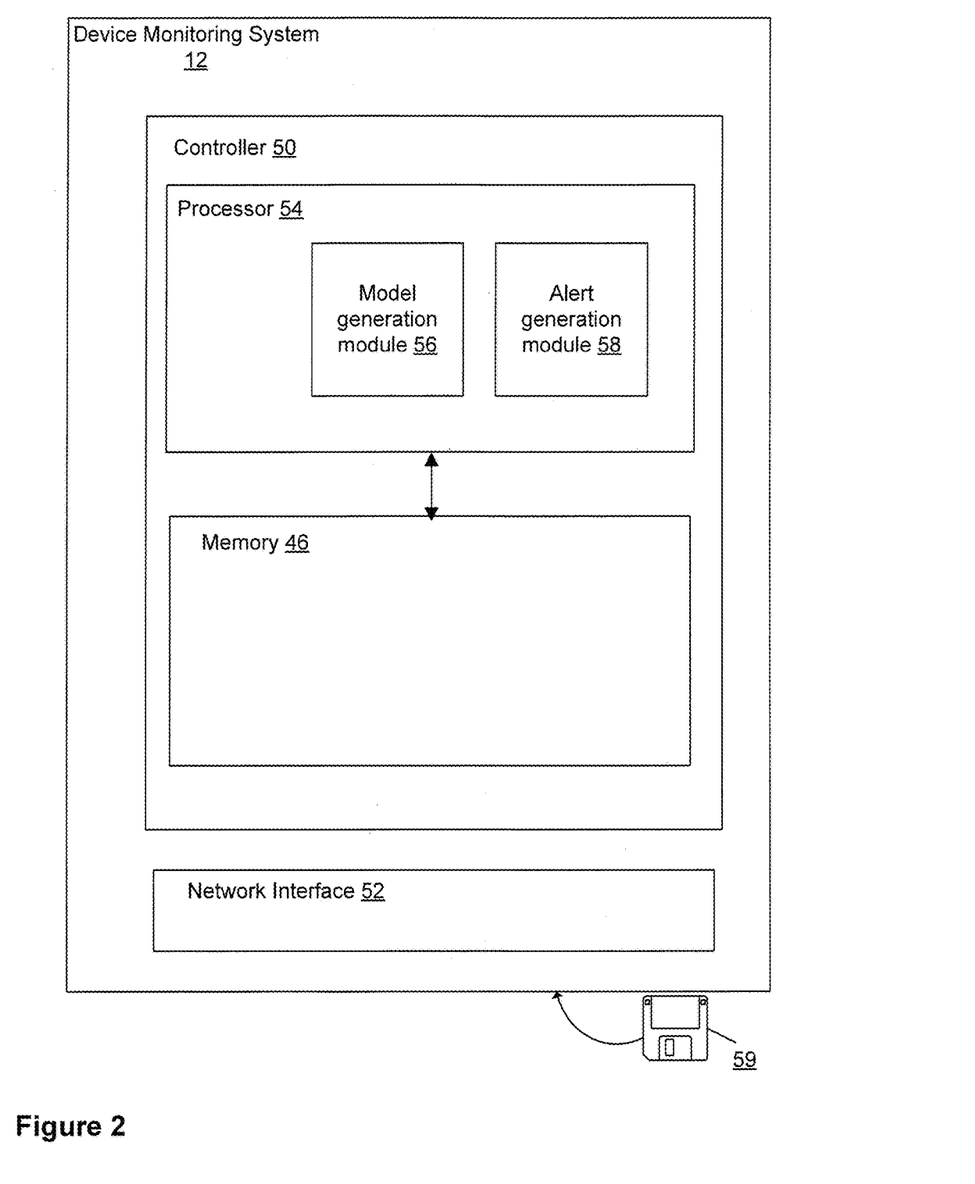
FIG. 2 is a block diagram illustrating an example device monitoring system within the electronic environment shown in FIG. 1.

FIG. 2 illustrates further detail about device monitoring system 12. As illustrated in FIG. 2, device monitoring system 12 includes controller 50, which in turn includes processor 54 and memory 46. Device monitoring system 12 also includes network interface circuitry 52.

Network interface circuitry 52 takes the form of an Ethernet card; in some arrangements, network interface circuitry 52 takes other forms including that of a wireless receiver or a token ring card, for example.

Memory 46 is configured to store code from various applications running on device monitoring system 12. Memory 46 is also configured to store likelihood values 38 and generated alerts 40. Memory 46 generally takes the form of, e.g., random access memory, although in some arrangements memory 46 includes flash memory or a non-volatile memory. It should be understood that the code may be stored within a computer program product (e.g., disk, CD, DVD, flash drive, or the like) such as computer program product 59.

Processor 54 takes the form of, but is not limited to CPUs that include a single or multiple cores each running single or multiple threads; processor 54 may also take the form of mobile CPUs such as ARM and the like. Processor 54 is coupled to memory 46 and is configured to execute instructions from the code. Processor 54 includes a model generation module 56 and an alert generation module 58. Model generation module 56 is configured to perform a correlation operation as described above in order to generate the model for deciding whether to issue an alert to system administrator 44. Alert generation module 58, on the other hand, is configured to apply the model generated by model generation module 56 to decide whether to issue an alert to system administrator 44.

In some arrangements, some of the code is directed to applications such as machine learning code that improve the applicability of the model used to predict when alerts should be sent to administrator 44. Such a machine learning application is described in connection with FIG. 3.

Figure 3:
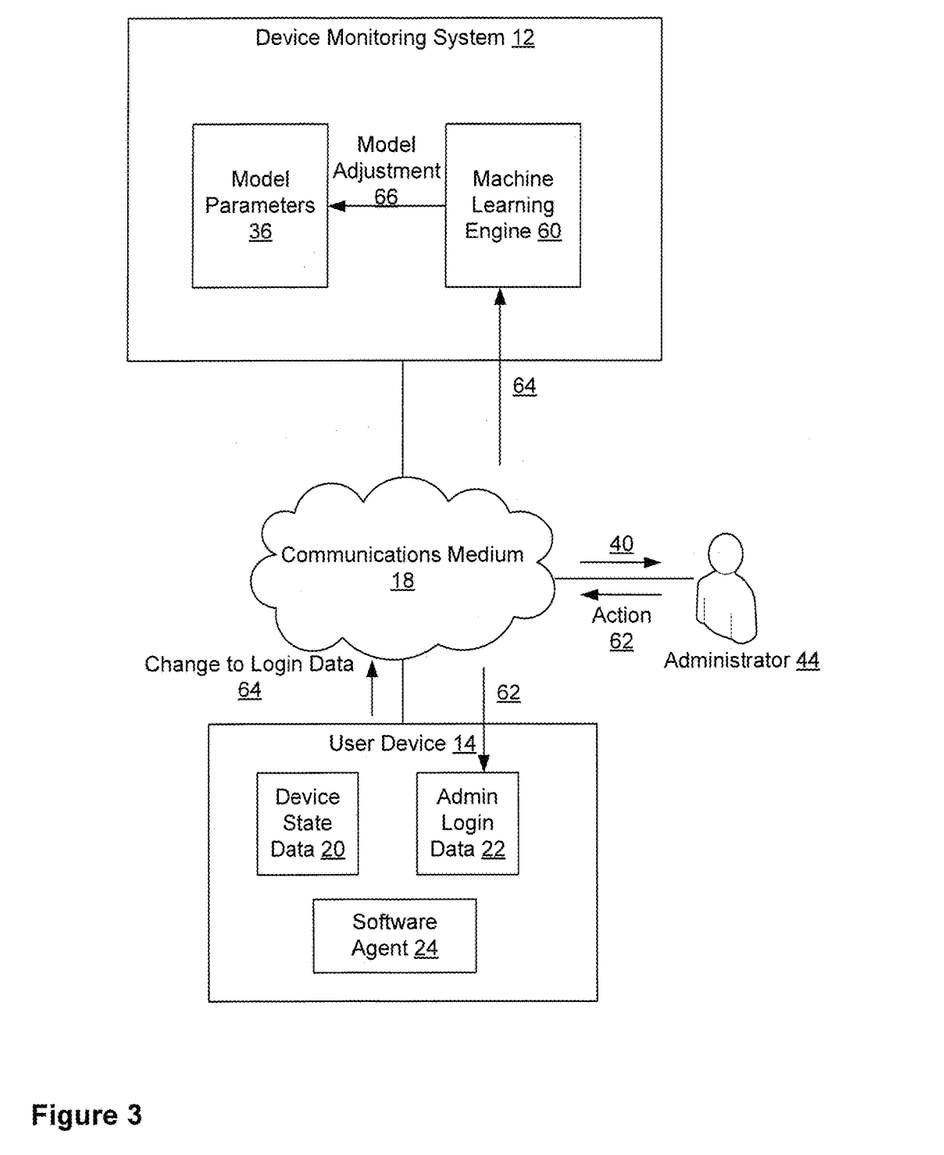
FIG. 3 is a block diagram illustrating an example machine learning engine stored in the device monitoring system shown in FIG. 2.

FIG. 3 illustrates a scenario in which machine learning is used to improve the validity of the model used to predict whether an alert should be sent to administrator 44. In this scenario, device monitoring system 12 accepts feedback in the form of a report 64 from user device 14 of a change—or lack thereof—to administrator login data 22. Device monitoring engine 12 is then configured to use this feedback to improve the model. To this effect, device monitoring system 12 further includes a machine learning engine 60.

During an example operation, administrator 44 receives an alert 40 from device monitoring system 12 in response to user device 14 sending state data 20 to device monitoring system 12. Administrator 44 may then choose whether to access user device 14 to address whatever issue may be the cause of the current device state. Suppose that administrator 44 chooses to access user device 14. In this case, user device 14 will update administrator login data 22 to reflect the new administrator activity 62.

Upon detecting a change in the administrator login data 22, software agent 24 sends a feedback notification 64 to device monitoring system 12 that the change occurred. Alternatively, if administrator 44 does not access user device 14 after receiving alert 40, then no notification may be necessary. Rather, device monitoring system 12 may keep track of a time elapse since alert 40 was sent to administrator 44; after a sufficient amount of time without being notified of a change in the administrator log data 22, device monitoring system 12 may consider feedback 64 to be an effective notification that there was no access 62 of user device 14 upon receipt of alert 40 by system administrator 44.

It should be understood that feedback 64 may also be received in response to no alert being issued to administrator. Again, software agent 24 may notify device monitoring system 12 of a change to administrator login data 22 even when no alert was issued. Moreover, no access in response to no alert being issued is a default result that may be expected by device monitoring system 12.

Once device monitoring system 12 receives feedback 64, device monitoring system 12 inputs feedback 64 into machine learning engine 60. Machine learning engine 60 is configured to provide an adjustment 66 to model parameter values 36 based on feedback 64. In some arrangements, machine learning engine 60 uses Bayesian learning techniques to provide adjustment 66 from feedback 64. In other arrangements, however, machine learning engine 60 uses neural networks, logistic regression, or the like, to produce adjustment 66.

As discussed previously, the device state space is potentially enormous, as there may be a diverse set of devices running various applications in different operating systems. In such an environment, a device suffering from a deviation in one of its state components could potentially be confused with a completely different device in a statistical analysis. Thus, it stands to reason that an accurate model may benefit from grouping similar devices together and defining different values of model parameters 36 for each group, or class. Such a grouping is discussed in FIG. 4.

Figure 4:
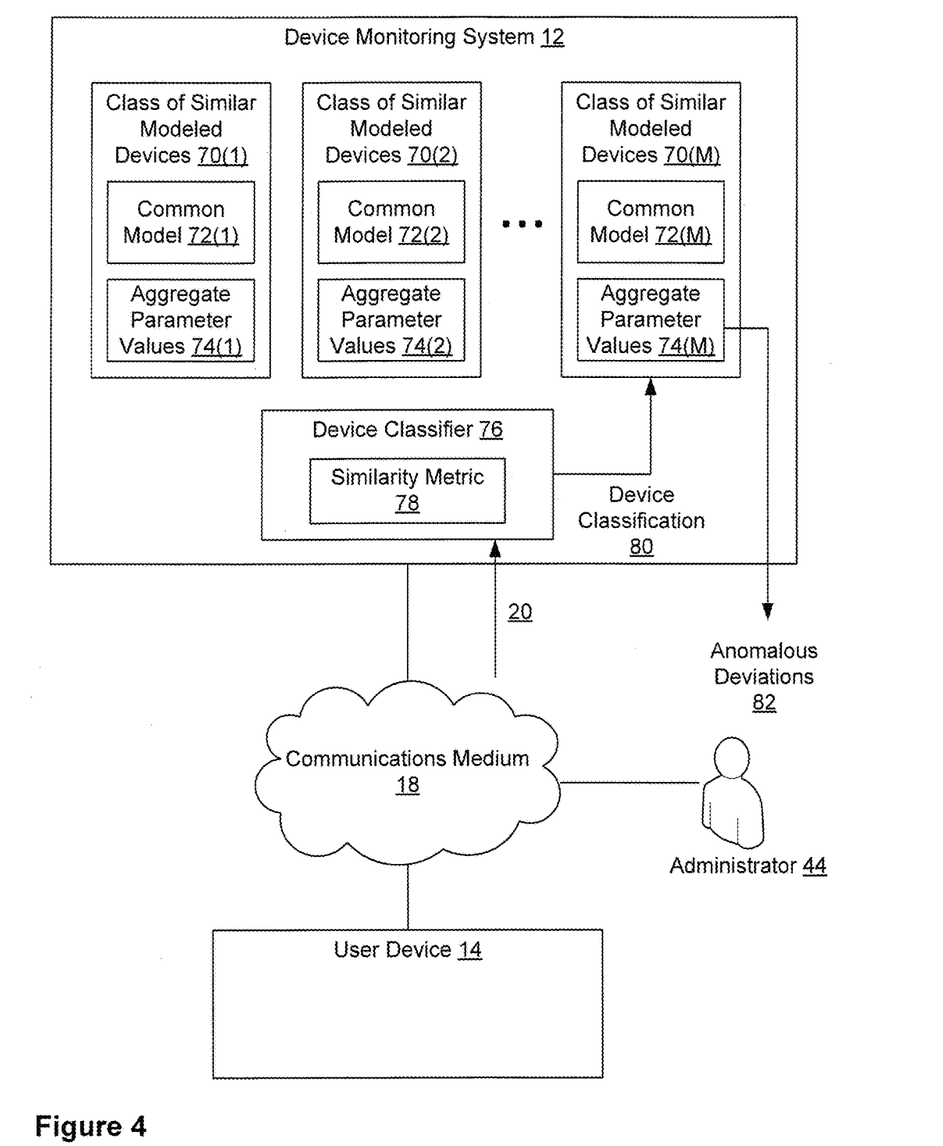
FIG. 4 is a block diagram illustrating example classes of similar modeled devices stored in the device monitoring system shown in FIG. 2.

FIG. 4 illustrates a set of classes of similar modeled devices 70(1), 70(2), . . . , 70(M), stored in device monitoring system 12, where M is the number of classes in the set. To this effect, device monitoring system 12 also includes a device classifier 76.

Each class of similar modeled device, say 70($m$), where $1<=m<=M$, describes devices that are similar according to a similarity metric 78. For example, a similarity metric 78 may take the form of a Euclidean distance between a pair of device state datasets, or the sum of absolute values of distances. Such a definition, however, would have to be nuanced somewhat in light of the fact that, while some components of the dataset include continuous parameters (e.g., memory utilization), other components are discrete, and even non-numerical (e.g., application installed and/or currently running). To this effect, then, device monitoring system 12 may assign each non-numerical parameter a discrete numerical value according to the features of the object represented by that parameter. For example, device monitoring system 12 may assign word processing applications a value between 10 and 20 depending on the brand, its features, etc., while assigning a database program a value between 40 and 70. Further, device monitoring system 12 may discretize continuous parameters by assigning various continuous intervals to various neighboring buckets. Class of similar devices 70($m$) includes a common model 72($m$) and aggregate parameter values 74($m$).

Common model 72($m$) includes a set of model parameter values used to map input device state data 20 into a likelihood that a typical administrator would access a modeled device that belongs to class 70($m$). Common model 72($m$) is unique to class 70($m$) in that device monitoring system 12 derives common model 72($m$) using historical state data and administrator login data only from devices 16 assigned to class 70($m$).

Aggregate parameter values 74($m$) represent typical values of each parameter representing a component of state data for devices in class 70($m$). To this effect, device monitoring system 12 may use aggregate parameter values 74($m$) to measure significant deviations from typical parameter values in devices assigned to class 70($m$). In some arrangements, aggregate parameter values 74($m$) are average values of parameters. Further, these values may take the on one of the discretized parameters values described above in connection with the similarity metric.

Device classifier 76 is a software module arranged to assign device state data 20 to a class, say, 70(M). To this effect, device classifier 76 is configured to compute a value of similarity metric 78 from device state data 20.

During operation, user device 14 sends device state data 20 to device monitoring system 12. Upon receipt of data 20, device monitoring system 12 routes data 20 to device classifier 76.

Device classifier 76 compares device state data 20 to each set of aggregate parameter values 74(1), 74(2), . . . , 74(M) according to similarity metric 78. In doing so, device classifier 76 assigns discrete values to each component of device state data 20. Device classifier 76 then sums the absolute values of the differences between values of each parameter value and corresponding aggregate parameter value 74($m$) for each class 70($m$), where $1<=m<=M$. In some arrangements, however, device classifier may use a Euclidean distance or some other distance metric in computing similarity metric 78.

Device classifier provides a device classification 80 by assigning device state data to a class of similar devices, say 70(M), based on the minimized distance from the aggregated parameter values 74(M) of that class 70(M). That is, device monitoring system 12 considers user device 14 to belong to class 70(M) based on device state data 20. It should be understood, however, that at another instant of time when device state data 20 takes on other values, device classifier 76 may assign device state data 20 to a different class.

It should also be understood that, in considering factors from which device classes are formed, long-lived states are preferable to short-lived states. For example, long-lived states may include configuration parameters and applications installed. Short-lived parameters, on the other hand, may include error logs.

Once device classifier 76 assigns device state data 20 to class 70(M), device monitoring system 12 applies common model 72(M) to device state data 20 in order to produce likelihood 38 that a typical administrator would access user device 14.

In some arrangements, device monitoring system 12 also examines deviations of device state data 20 from the aggregate parameter values 74(M) of the class to which device state data was assigned. Even though the assignment to class 70(M) may be based on a minimum average deviation, one or more deviations may be large enough to warrant concern over the behavior of the corresponding components. For example, memory utilization for user device 14 may be more than two standard deviations from the aggregate value for class 70(M). In this case, device monitoring system 12 may automatically generate an alert 40 based solely on the existence of such a deviation.

In some arrangements, device monitoring system 12 is able to assist administrator 44 further. For example, using similar techniques to those described above, device monitoring system 12 may be able to offer administrator 44 a solution script that automatically fixes any problems in user device 14 to which alert 40 is configured to bring to the attention of administrator 44. The generation of such a script is described in connection with FIG. 5.

Figure 5:
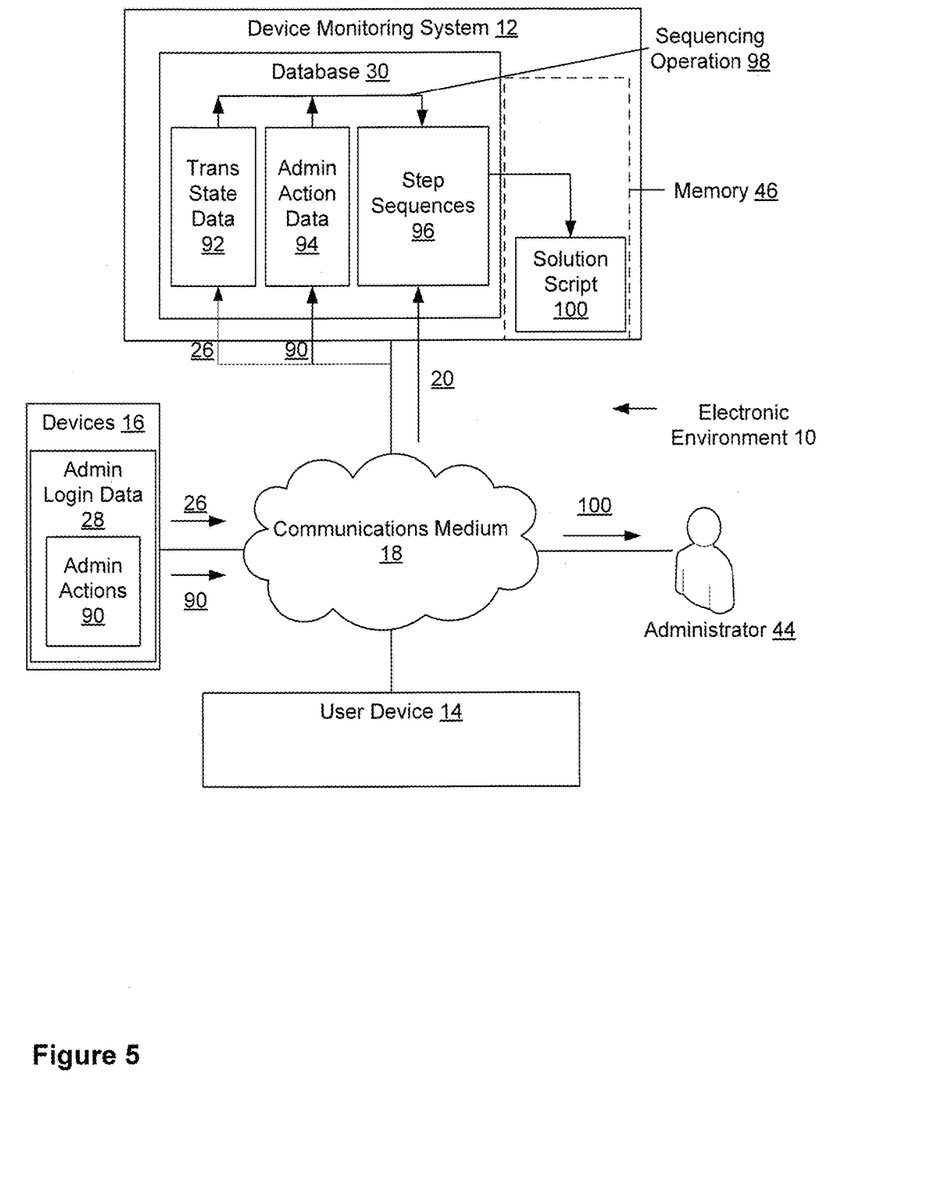
FIG. 5 is a block diagram illustrating an example solution script produced by the device monitoring system shown in FIG. 2.

FIG. 5 illustrates a process of generating a solution script file 100 in response to receipt of device state data 20. In this case, device monitoring system 12 is further configured to generate solution scripts from a set of step sequences 96 stored in database 30 based on device state data 20.

Step sequences 96 contain sequences of individual actions (e.g., mouse clicks, keystrokes, textual commands, etc.) taken by administrators to effect a transition between device states. In some arrangements, device monitoring system also stores transition state data 92 and administrator action data 94 in database 30 in order to build step sequences 96.

Transition state data 92 contains state data pairs adjacent in time from devices 16. Thus, device monitoring system 12 forms transition state data 92 by forming pairs of previous and current device state data 26 for each of the set of devices 16.

Administrator action data 94 contains administrator actions taken by an administrator that led to a transition between states. Again, the actions may be mouse clicks, keystrokes, or commands used to cause actions in a device 16.

To build step sequences 96, device monitoring system 12 performs a sequencing operation 98, analogous to correlation operation 42, in which administrator actions and transition states are correlated to find the most likely cause (actions) and corresponding effect (transition state). In some arrangements, device monitoring system 12 simply finds devices that have the same beginning state projection and final state projection of parameters onto a subspace; then, any sequence that took that device from the beginning state to the final state, e.g., the most frequently used sequence or subsequence. In other arrangements, device monitoring system 12 assigns a correlation coefficient to each sequence of steps that effect a transition between device states; such a correlation coefficient is high when there are a significant number of transition states being effected by the same sequence of steps.

It should be understood that there may be many ways in which to express such steps. For example, the steps may be expressed as human-readable instructions, or the steps may be expressed in terms of a sequence of machine state changes. In order to compare sequences of steps—and subsequences of those steps—device monitoring system 12 may define a normal form for the steps while being aware of the existence of the subsequences as well as the full sequences. For example, steps without dependencies on each other may be rearranged. Along these lines, however, is the notion of equivalence among step sequences. In the absence of a normal form, equivalent step sequences may be defined as sequences that effect the same transition states. A normal form, then, ensures that equivalent step sequences are equal.

It should also be understood that device monitoring system 12 is also configured to monitor the use of solution script 100 in user device 14 or any other of the devices 16. A purpose in doing so is to include the running of such a script in a sequence of steps that result in a transition state.

During an example operation, user device 14 sends device state data 20 to device monitoring system 12. Upon receipt of device state data 20, device monitoring system 12 device state data 20 to a class of modeled devices 70(M) as described previously. Device monitoring system 12 determines if any problems exist with user device 14 by computing deviations of device state data 20 from aggregate parameter values 74(M) for that class. If there is indeed a significant deviation indicative of a problem, device monitoring system 12 forms a transition state by forming the device state data with the deviation eliminated, i.e., the parameter value being set to the aggregate value specified in 74(M).

Device monitoring system 12 inputs this transition state into the step sequences 96 and finds the most commonly used sequence that brings user device 14 from its beginning state to its final state. It should be understood that the precise transition state may be located within step sequences 96; in this case, device monitoring system 12 outputs the exact sequence prescribed by the highest correlation coefficient. In other arrangements, however, the precise transition state may not be located within step sequences 96. In this case, device monitoring system 12 searches for subsequences that may effect the transition state.

Once device monitoring system 12 outputs a sequence if steps that effects the transition state, device monitoring system 12 generates a solution script file 100 for effecting the transition on user device 14. The form of such a solution script file 100 will vary depending on the form of user device 14. For example, when user device 14 is a desktop PC, solution script file 100 may be a PowerShell script, a Visual Basic script, or another script that may be run by software agent 24. On the other hand, if user device 14 is a smartphone running an Android operating system, software agent 24 would run steps of a sequence as needed and the resulting script would be custom-built. Furthermore, some operations may be described in English for easy understanding by system administrators; such a description may be provided as comments in a script.

In some arrangements, the solution script file 100 may contain a reference to another solution script file. In this case, device monitoring system 12 would provide such a file in addition to solution script file 100.

It should be understood that device monitoring system 12 also provides alerts 40 in addition to solution script file 100. Thus, alert 40 would provide context to the solution script file 100 in terms of the transition state effected by solution script file 100. As an example, suppose that software agent 24 on a device 16 collects processor and memory utilization data only. Suppose further that here is a bad application that uses much of the available memory and processor resources; this causes administrators to log in and shut down the application when they observe the device 16 acting sluggishly. Device monitoring system 12, then would notice from the above-described sequencing operation 98 that a significant fraction of administrators of similar devices are performing the same shutting-down subsequence of steps. Thus, device monitoring system 12 will infer that any similar device acting slugglishly in a similar manner will also want to take the same subsequence of steps, and will generate a script that shuts down the bad application automatically. In addition, device monitoring system 12 provides an alert 40 which describes the problem and informs administrator 44 that the enclosed script will solve the problem.

Along these lines, device monitoring system 12 is able to assist administrator 44 further by automatically identifying bad hardware and/or software that cause anomalous behavior of other applications running on user device 14. In doing this, device monitoring system 12 uses similar techniques as described above to discern patterns in aggregated device state data that point to hardware and software combinations that cause bad device behavior. Such capability is described in connection with FIG. 6.

Figure 6:
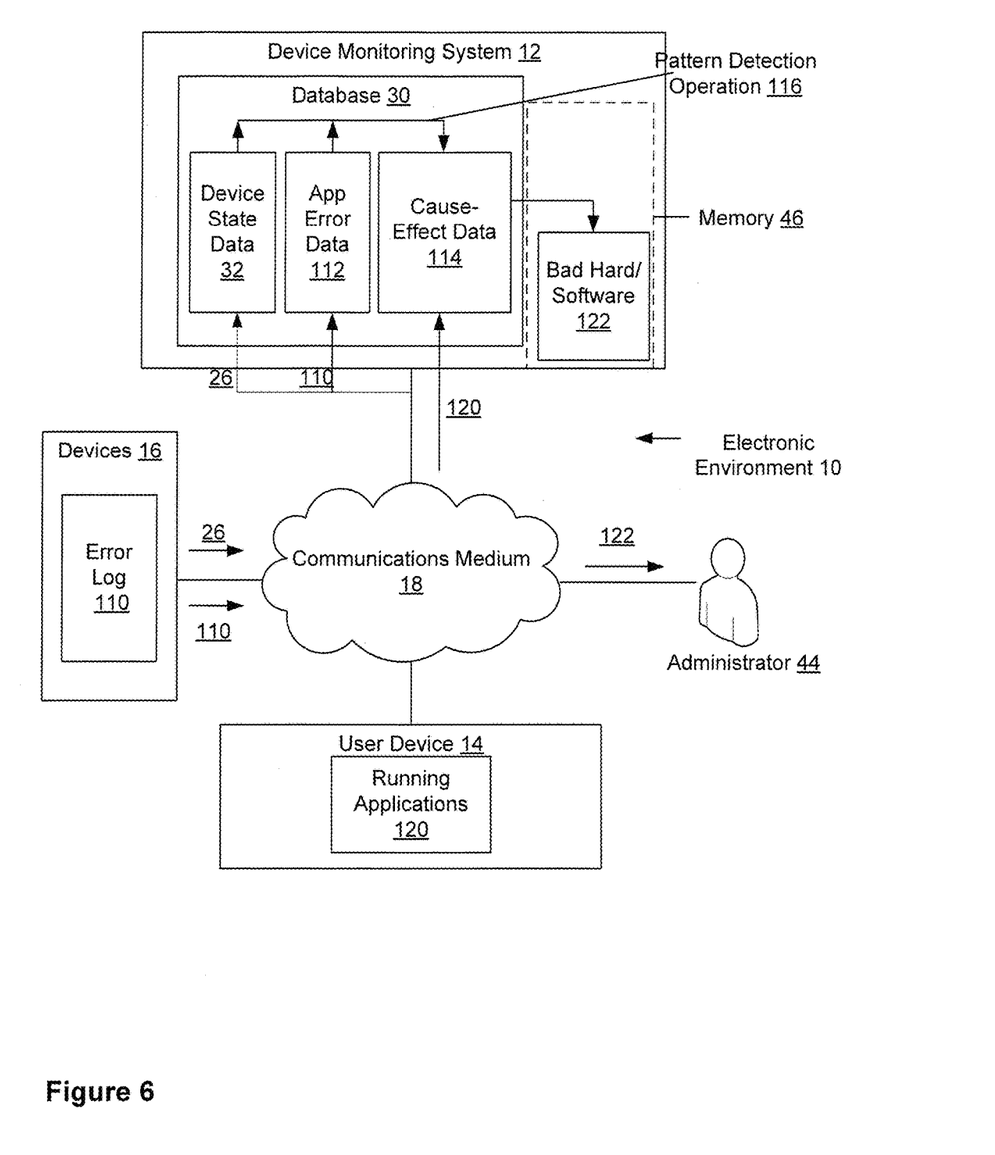
FIG. 6 is a block diagram illustrating an example bad hard/software notification produced by the device monitoring system shown in FIG. 2.

FIG. 6 illustrates a process of identifying bad hardware and/or software from aggregated state data 32 and application error data 112 taken from device error logs 110.

It should be understood that, when a problem arises on a device 16, device 16 is arranged to store the cause of the problem, along with a description of the problem, in error log 110. For example, when an application crashes, error log 110 notes the time of the crash and the application that caused the crash. Device state data 26 will contain information on what other applications were running at the time of the crash.

In some arrangements, upon the occurrence of an event such as a crash, a device 16 is arranged to send device state data 26 and error log 110 to device monitoring system 110. Device monitoring system 12, in turn, is arranged to store the data in error log 110 in database 30, within application error data 112.

Device monitoring system 12 is then configured to generate cause/effect data 114 from device state data 32 and application error data 112. Cause/effect data 114 contains pairs of applications and/or hardware and their correlation to a device state that the pair may have caused. Device monitoring system 12 computes correlations of each pair from a pattern detection operation 116. From these correlations, device monitoring system 12 may then determine a combination 122 of software and/or hardware that likely caused a crash or other anomalous behavior in a device 16.

During operation, user device 14 experiences an anomalous event (e.g., a crash, a quickly-drained battery, or the like). Upon detection of the anomalous event, software agent 24 sends a list of running applications 120, as well as device state data 20, to device monitoring system 12. From the list 120, device monitoring system 12 performs a comparison with application pairs in cause/effect data 114 to determine if any such pairs exist in running applications 120. Upon detection of such a pair, or even a single application, device monitoring system 12 generates a notification 122 that a bad hardware and/or software combination is running and is likely the cause of the problems observed.

It should be understood, however, that device monitoring system 12 can act preemptively rather than reactively. To this effect, upon discovery of pair of applications and/or hardware that cause anomalous behavior in devices in certain states, device monitoring system 12 can publish a listing of all such pairs and send to all active administrators. The usefulness of such a list may be seen in, for example, a warning not to upgrade certain software when the device runs other software.

As a concrete example of this bad application detection, suppose that two applications are running: A and B. Application A was seen to be crashing more frequently when application B was installed and running. Suppose further that an Application C also crashes more frequently when Application B is running. Device monitoring system 12 will infer that Application B is likely to be defective.

Figure 7:
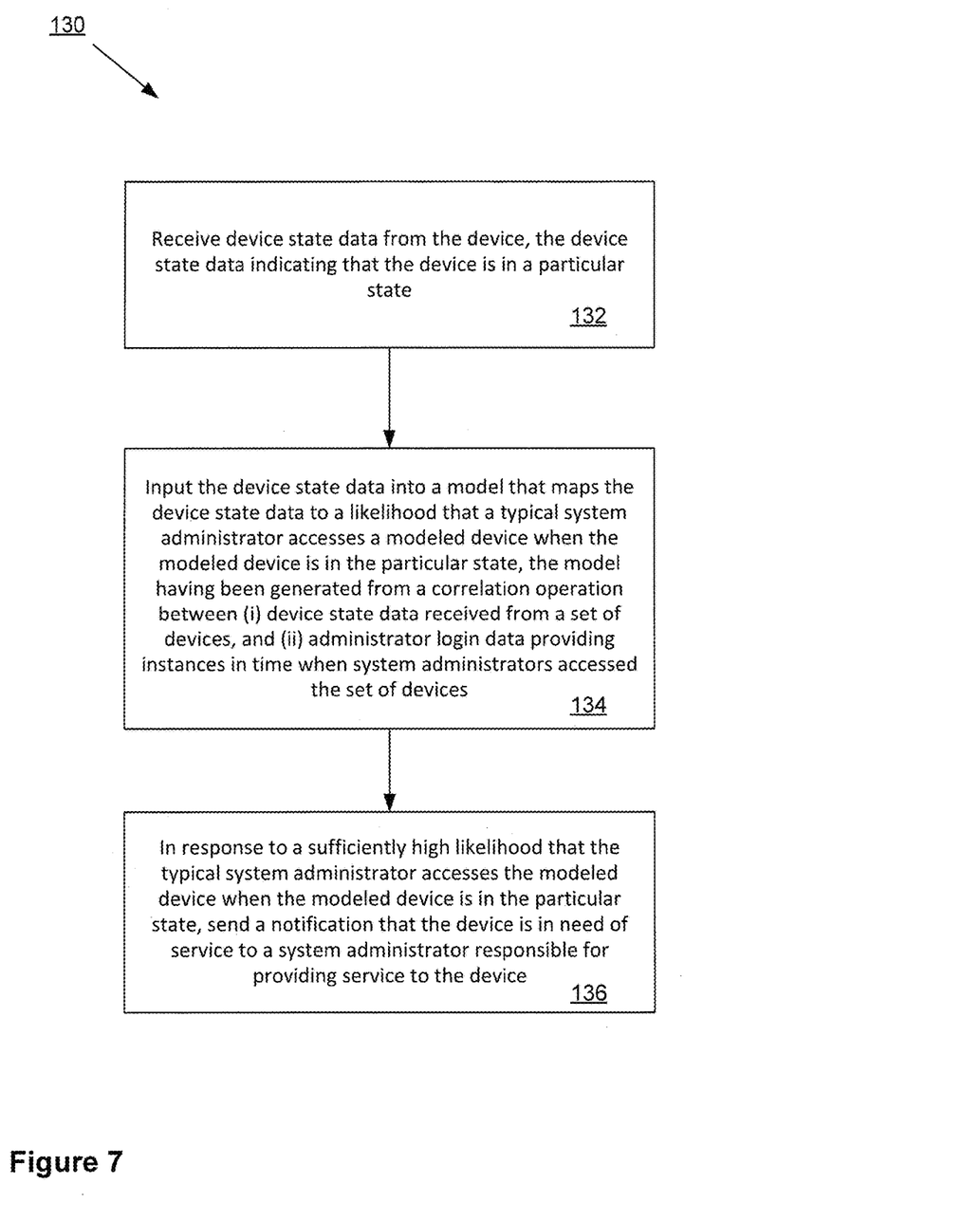
FIG. 7 is a flow chart illustrating an example method of carrying out the improved technique within the electronic environment shown in FIG. 1.

FIG. 7 illustrates a method 130 of identifying when a device is in need of service, including steps 132, 134, and 136. In step 132, device state data (e.g., data 20) is received from the device (e.g., user device 14), the device state data indicating that the device is in a particular state. In step 134, the device state data is input into a model (e.g., model 36) that maps the device state data to a likelihood (e.g., likelihood 38) that a typical system administrator accesses a modeled device when the modeled device is in the particular state, the model having been generated from a correlation operation (e.g., correlation operation 42) between (i) device state data received from a set of devices (e.g., device state data 32), and (ii) administrator login data providing instances in time when system administrators accessed the set of devices (e.g., administrator login data 34). In step 136, in response to a sufficiently high likelihood that the typical system administrator accesses the modeled device when the modeled device is in the particular state, a notification (e.g., alert 40) that the device is in need of service is sent to a system administrator (e.g., administrator 44) responsible for providing service to the device.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to device monitoring system 12, which is constructed and arranged to identify when a device is in need of service. Some embodiments are directed to a process of identifying when a device is in need of service. Also, some embodiments are directed to a computer program product that enables computer logic to cause a computer to identify when a device is in need of service.

In some arrangements, device monitoring system 12 is implemented by a set of cores or other types of control/processing circuitry running software. In such arrangements, the software instructions can be delivered, within device monitoring system 12, either in the form of a computer program product 59 (see FIG. 2), or simply instructions on disk or in pre-loaded in memory 46 of device monitoring system 12, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. In a device monitoring system, a method of identifying when a device is in need of service, the method comprising:
receiving device state data from the device, the device state data indicating that the device is in a particular state;
inputting the device state data into a model that maps the device state data to a likelihood that a system administrator accesses a modeled device when the modeled device is in the particular state, the model having been generated from a correlation operation between (i) device state data received from a set of devices, and (ii)

administrator login data providing instances in time when system administrators accessed the set of devices;

in response to a predetermined likelihood that the system administrator accesses the modeled device when the modeled device is in the particular state, sending a notification that the device is in need of service to a particular system administrator responsible for providing service to the device; and prior to receiving the device state data from the device:
obtaining the device state data from each of the set of devices;
obtaining the administrator login data from each of the set of devices;
performing the correlation operation to generate the model; and
storing the model, the device state data, and the administrator login data in a database, wherein receiving the device state data from the device includes assigning the device to a particular class of modeled devices according to a predetermined metric, the device state data of each device of the set of devices including values of a set of state parameters, each of the set of state parameters representing a corresponding feature of that device, the predetermined metric for each class of modeled devices being defined by an aggregate value for each of the set of state parameters, wherein assigning the device to the particular class of modeled devices includes evaluating a difference between values of parameters of the set of parameters of the device and the aggregate values of the parameters, the device belonging to the set of devices, and each device of the set of devices being a computerized device having memory, processing circuitry, and application software installed on the device, the application software being executed by the processing circuitry, the notification being sent in response to receipt of the device state data, wherein sending the notification includes sending the notification over an electronic communications network to a communications device associated with the particular system administrator, the notification being configured to initiate (i) a change in the administrator login data, and (ii) a report of the change in the administrator login data to be sent from the device to the device monitoring system, and wherein the method further comprises:
receiving the report of the change in the administrator login data from the device over the electronic communications network; and
performing a further correlation between the device state data and the change in the administrator login data to affect an improvement in the model.

2. A method as in claim 1, wherein obtaining the device state data from each of the set of devices includes:
installing a software agent on that device, the software agent being configured to (i) collect device state data from that device, and (ii) cause that device to send the collected device state data to the database for storage; and
receiving the collected device state data from that device.

3. A method as in claim 2, wherein obtaining the device state data from each of the set of devices further includes receiving the device state data in response to the software agent observing the change in the administrator login data of that device; and
wherein obtaining the administrator login data from each of the set of devices includes receiving the change in the administrator login data observed by the software agent installed on that device.

4. A method as in claim 3, where performing the correlation operation includes, upon receiving the change in the administrator login data from that device, forming a transition state from a difference between the device state data received from that device in response to the change in the administrator login data and a previous device state data received from that device, the model generated being based on the transition state.

5. A method as in claim 1, further comprising:
receiving an indication of whether the particular system administrator responsible for providing service to the device accessed the device in response to receiving the notification that the device is in need of service; and
inputting the indication into a machine learning module, the machine learning module being configured to adjust the model based on indications of whether a system administrator responsible for providing service to a device accessed the device in response to receiving the notification that the device is in need of service.

6. A method as in claim 1, wherein performing the correlation operation includes deriving, from the device state data, classes of modeled devices, each class of modeled devices including modeled devices having device states according to a predetermined metric, each class of modeled devices having a common model that maps device state data indicative of a device being in a given state to the likelihood that a system administrator accesses a modeled device when the modeled device is in the given state;
wherein receiving the device state data from the device includes assigning the device to a particular class of modeled devices; and
wherein inputting the device state data into the model includes inputting the device state data into the common model of the particular class of modeled devices.

7. A method as in claim 1, wherein sending the notification that the device is in need of service to the particular system administrator responsible for providing service to the device includes verifying, from the model, whether the particular system administrator is likely to access the device in response to receiving a particular alert.

8. A method as in claim 1, wherein obtaining the device state data from each of the set of devices includes:
receiving, via an electronic communications network, the device state data from a software agent installed on each device of the set of devices, the software agent installed on each device being configured to collect device state data from that device.

9. A method as in claim 8, wherein the method further includes receiving additional device state data and, in response to a likelihood lower than a predetermined threshold that the system administrator accesses the modeled device when the modeled device is in a particular state corresponding to the additional device state data, suppressing the notification that the device is in need of service to the particular system administrator responsible for providing service to the device.

10. A method as in claim 9 wherein the set of state parameters of each device of the set of devices includes at least one state parameter describing an amount of utilization of computational resources of the respective device.

11. In a device monitoring system, a method of identifying when a device is in need of service, the method comprising:

receiving device state data from the device, the device state data indicating that the device is in a particular state;

inputting the device state data into a model that maps the device state data to a likelihood that a system administrator accesses a modeled device when the modeled device is in the particular state, the model having been generated from a correlation operation between (i) device state data received from a set of devices, and (ii) administrator login data providing instances in time when system administrators accessed the set of devices;

in response to a predetermined likelihood that the system administrator accesses the modeled device when the modeled device is in the particular state, sending a notification that the device is in need of service to a particular system administrator responsible for providing service to the device; and prior to receiving the device state data from the device:
obtaining the device state data from each of the set of devices;
obtaining the administrator login data from each of the set of devices;
performing the correlation operation to generate the model; and
storing the model, the device state data, and the administrator login data in a database, wherein performing the correlation operation includes deriving, from the device state data, classes of modeled devices, each class of modeled devices including modeled devices having device states according to a predetermined metric, each class of modeled devices having a common model that maps device state data indicative of a device being in a given state to the likelihood that a system administrator accesses a modeled device when the modeled device is in the given state, wherein receiving the device state data from the device includes assigning the device to a particular class of modeled devices, wherein inputting the device state data into the model includes inputting the device state data into the common model of the particular class of modeled devices, device state data of each device including values of a set of state parameters, each of the set of state parameters representing a corresponding feature of that device, the predetermined metric for each class of modeled devices being defined by an aggregate value for each of the set of state parameters, wherein assigning the device to the particular class of modeled devices includes evaluating a difference between values of parameters of the set of parameters of the device and the aggregate values of the parameters, the notification being sent in response to receipt of the device state data, wherein sending the notification includes sending the notification over an electronic communications network to a communications device associated with the particular system administrator, the notification being configured to initiate (i) a change in the administrator login data, and (ii) a report of the change in the administrator login data to be sent from the device to the device monitoring system, and wherein the method further comprises:
receiving the report of the change in the administrator login data from the device over the electronic communications network; and performing a further correlation between the device state data and the change in the administrator login data to affect an improvement in the model.

12. A method as in claim 11, further comprising receiving a selected set of parameters of the set of parameters;
wherein evaluating the difference between the values of the parameters of the set of parameters of the device and the aggregate values of the parameters includes computing a difference between the values of parameters of the selected set of parameters and the aggregate values of the selected set of parameters only.

13. A method as in claim 11, wherein deriving the classes of modeled devices includes, for each class of modeled devices, assigning a mean value of a state parameter of the set of state parameters, the mean value being equal to an average value of the state parameter taken over the devices assigned to that class of modeled devices; and
wherein inputting the device state data into the model includes evaluating a deviation of the value of the state parameter of the device state data of the device from the mean value of the state parameter for the class to which the device is assigned.

14. A method as in claim 11, wherein sending the notification that the device is in need of service includes sending a solution script to the particular system administrator responsible for providing service to the device, the solution script containing a sequence of steps configured to bring the device from the particular state to a second state, the solution script having been generated from sequences of steps received from the set of devices, each sequence of steps having been taken upon a login by a system administrator of a device that was recorded in the administrator login data of that device.

15. A method as in claim 14, further comprising:
obtaining, from each of the set of devices and prior to sending the notification, a sequence of steps taken by the particular system administrator responsible for providing service to that device, the sequence of steps being taken upon a login by the particular system administrator that was recorded in the administrator login data received from that device; and
generating, from sequences of steps obtained from the set of devices, the solution script configured to bring the device from being in the particular state to being in the second state.

16. A method as in claim 15, wherein generating the solution script includes:
locating devices assigned to a class of modeled devices which exhibit a transition between being in the first state and being in the second state; and
for each device located, identifying steps of the sequences of steps that accomplish the transition.

17. A method as in claim 16, wherein generating the solution script further includes
translating the identified steps into a scripting language compatible with the device; and
producing a solution script file containing the solution script expressed in the scripting language compatible with the device.

18. A method as in claim 16, wherein identifying the steps includes obtaining a script used in transitioning that device from being in the first state to being in the second state.

19. A method as in claim 11, wherein an application state parameter of the set of state parameters of the device has a value identifying applications running on the device; and
wherein sending the notification that the device is in need of service includes identifying (i) a first application of the set of applications exhibiting a predetermined behavior, and (ii) a second application of the set of applications causing the predetermined behavior exhibited by the first application.

20. A method as in claim 19, further comprising obtaining, from each of the set of devices and prior to sending the notification, an error log corresponding to each application running on that device, the error log indicating times at which that application exhibited predetermined behavior; and wherein identifying the first application of the set of applications exhibiting predetermined behavior includes reading an error log corresponding to the first application received from the device.

21. A method as in claim 20, further comprising performing a pattern detection operation on the error logs received from the set of devices, the pattern detection operation being configured to identify second applications of the set of applications that cause first applications of the set of applications to exhibit predetermined behavior.

22. An electronic apparatus constructed and arranged to identify when a device is in need of service, the apparatus comprising:

a network interface; and
a controller containing memory circuitry and controlling circuitry coupled to the memory circuitry, the controlling circuitry being constructed and arranged to:
receive device state data over the network interface from the device, the device state data indicating that the device is in a particular state;
input the device state data into a model that maps the device state data to a likelihood that a system administrator accesses a modeled device when the modeled device is in the particular state, the model having been generated from a correlation operation between (i) device state data received from a set of devices, and (ii) administrator login data providing instances in time when system administrators accessed the set of devices; and
in response to a predetermined likelihood that the system administrator accesses the modeled device when the modeled device is in the particular state, send, over the network interface, a notification that the device is in need of service to a particular system administrator responsible for providing service to the device,
wherein the controlling circuitry is further constructed and arranged to, prior to receiving the device state data from the device:
obtain the device state data from each of the set of devices;
obtain the administrator login data from each of the set of devices;
perform the correlation operation to generate the model; and
store the model, the device state data, and the administrator login data in a database, and
wherein the controlling circuitry is further constructed and arranged to:
assign the device to a particular class of modeled devices according to a predetermined metric, the device state data of each device of the set of devices including values of a set of state parameters, each of the set of state parameters representing a corresponding feature of that device, the predetermined metric for each class of modeled devices being defined by an aggregate value for each of the set of state parameters; and
evaluate a difference between values of parameters of the set of parameters of the device and the aggregate values of the parameters, the device belonging to the set of devices, and each device of the set of devices being a computerized device having memory, processing circuitry, and application software installed on the device, the application software being executed by the processing circuitry.

23. A computer program product comprising a non-transitory, computer-readable storage medium which stores code, the code including a compiler which when executed by a computer configured to identify when a device is in need of service, causes the computer to:

receive device state data over the network interface from the device, the device state data indicating that the device is in a particular state;
input the device state data into a model that maps the device state data to a likelihood that a system administrator accesses a modeled device when the modeled device is in the particular state, the model having been generated from a correlation operation between (i) device state data received from a set of devices, and (ii) administrator login data providing instances in time when system administrators accessed the set of devices; and
in response to a predetermined likelihood that the system administrator accesses the modeled device when the modeled device is in the particular state, send, over the network interface, a notification that the device is in need of service to a particular system administrator responsible for providing service to the device,
wherein, prior to causing the computer to receive the device state data from the device, the code, when executed by the computer, causes the computer to:
obtain the device state data from each of the set of devices;
obtain the administrator login data from each of the set of devices;
perform the correlation operation to generate the model; and
store the model, the device state data, and the administrator login data in a database, and
wherein the code, when executed by the computer, further causes the computer to:
assign the device to a particular class of modeled devices according to a predetermined metric, the device state data of each device of the set of devices including values of a set of state parameters, each of the set of state parameters representing a corresponding feature of that device, the predetermined metric for each class of modeled devices being defined by an aggregate value for each of the set of state parameters;
evaluate a difference between values of parameters of the set of parameters of the device and the aggregate values of the parameters, the device belonging to the set of devices, and each device of the set of devices being a computerized device having memory, processing circuitry, and application software installed on the device, the application software being executed by the processing circuitry, the notification being sent in response to receipt of the device state data;
send the notification over an electronic communications network to a communications device associated with the particular system administrator, the notification being configured to initiate (i) a change in the administrator login data, and (ii) a report of the change in the administrator login data to be sent from the device to the device monitoring system;

receive, from the device, the report of the change in the administrator login data; and perform a further correlation between the device state data and the change in the administrator login data to affect an improvement in the model.

\* \* \* \* \*